(12) United States Patent
Terai

(10) Patent No.: US 7,657,150 B2
(45) Date of Patent: Feb. 2, 2010

(54) OPTICAL DISK APPARATUS

(75) Inventor: Hiroshi Terai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 983 days.

(21) Appl. No.: 11/282,682

(22) Filed: Nov. 21, 2005

(65) Prior Publication Data
US 2006/0110138 A1    May 25, 2006

(30) Foreign Application Priority Data
Nov. 22, 2004    (JP)    ............. P2004-338112

(51) Int. Cl.
H04N 9/00 (2006.01)
H04N 9/88 (2006.01)
H04N 5/91 (2006.01)
H04N 5/00 (2006.01)
H04N 5/45 (2006.01)
H04N 7/16 (2006.01)

(52) U.S. Cl. ............... 386/3; 386/1; 386/94; 386/96; 386/125; 386/126; 348/565; 725/25

(58) Field of Classification Search ............ 386/1, 386/46, 52–55, 94, 96, 125, 126; 348/565; 725/13, 31–33
See application file for complete search history.

(56) References Cited

U.S. PATENT DOCUMENTS 5,825,968 A * 10/1998 Nishigaki et al. ............. 386/94
6,072,541 A * 6/2000 Song .......................... 348/706

FOREIGN PATENT DOCUMENTS

| JP | A-11-149757 | 6/1999 |
| JP | A-2002-271715 | 9/2002 |
| JP | A-2003-228400 | 8/2003 |

* cited by examiner

*Primary Examiner*—Marsha D Banks Harold
*Assistant Examiner*—Michael Choi
(74) *Attorney, Agent, or Firm*—Morgan, Lewis & Bockius LLP

(57) ABSTRACT

An optical disk apparatus is configured to switch the audio signals to be output to the sound output terminal by means of the slide switch having contact points that activate in association with the state switched by a mechanical manipulation. When the state of the slide switch is switched to the state where the externally-input audio signal is output to the sound output terminal from the state where the audio signal is output to the sound output terminal, a video signal of a composite video on which the OSD image, indicating that the output is switched to the external signal from the internal signal, is kept output to the video output terminal until a time period has passed.

5 Claims, 4 Drawing Sheets

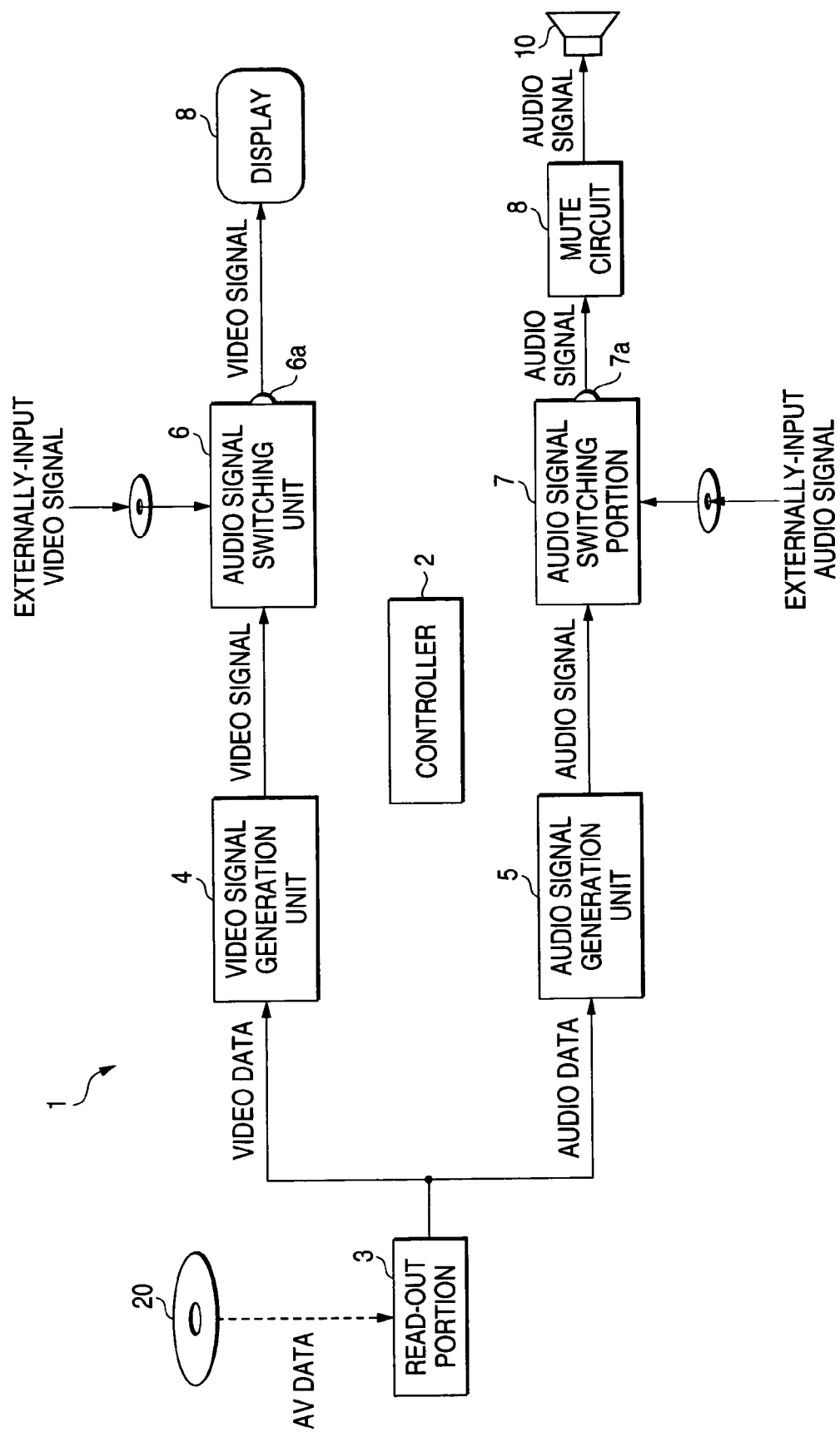

OPTICAL DISK APPARATUS

BACKGROUND OF THE INVENTION

1. Field

The present invention relates to an optical disk apparatus that plays an optical disk, such as a CD and a DVD, and more particularly, to a portable optical disk apparatus provided with a display and speakers for outdoor use.

2. Description of the Related Art

An optical disk apparatus in the related art that plays back videos and audios recorded in an optical disk, is such as a CD or a DVD, has been put into practical use, and is now in widespread use. A portable (mobile) optical disk apparatus provided with relatively small display and speakers for outdoor use is put into practical use. A typical optical disk apparatus is provided with a selector switch that switches an output to an internal signal or an external signal. The internal signal referred to herein means a video signal and a audio signal according to AV data (video data and audio data) recorded in an optical disk, and the external signal means an externally-input video signal and an externally-input audio signal inputted from the outside.

A typical optical disk apparatus in the related art is provided with a switch to maintain a state mechanically manipulated by the user, for example, a slide switch, as the selector switch. The user confirms which of the internal signal and the external signal is selected by confirming the state of the selector switch. Also, the optical disk apparatus in the related art is configured to detect the state of the selector switch by means of a controller for controlling a video signal switching unit that switches video signals (internal signal or external signal) to be output or an audio signal switching portion that switches audio signals (internal signal or external signal) to be output in response to the detected state. The video signal switching unit and the audio signal switching portion in the typical optical disk apparatus in the related art comprise multiplexers.

Also, when the selector switch is manipulated mechanically and switched to a state where the external signal is selected from a state where the internal signal is selected, the optical disk apparatus in the related art generates and outputs a video signal in which an OSD (On Screen Display) image (for example, a character image of "AUX") indicating the switching of an output to the external signal on videos of the internal signal for a time period (for example, about 5 sec). After the time period has passed since the selector switch is switched to the state where the external signal is selected from the state where the internal signal is selected, a video signal output from the video signal switch portion is switched to the external signal and an audio signal output from the audio signal switching portion is switched to the external signal from the internal signal. In this manner, the switching from the internal signal to the external signal is delayed by a time period from the actual manipulation of the selector switch. The reason why the apparatus is configured in this manner is as follows. That is, when the internal signal is switched to the external signal almost in real time in response to the actual manipulation of the selector switch, an output of videos and audios stops abruptly unless the external signal has been inputted into the main body. Many users misunderstand this event as a failure of the apparatus. This configuration is to avoid such a misunderstanding of the users. Such a misunderstanding readily occurs, in particular, when the user is unaware of having manipulated the selector switch, for example, in a case where the user erroneously manipulates the selector switch while he is making other manipulations on the apparatus main body. The switching from the internal signal to the external signal is therefore delayed for a time period from the actual manipulation of the selector switch for the user to acknowledge the switching to the external signal by seeing the OSD image during this latency in avoiding such a misunderstanding of the user.

Examples of the conventional optical disk apparatuses are disclosed in JP-A-11-149757, JP-A-2003-228400, and JP-A-2002-271715.

The optical disk apparatus in the related art has the audio signal switching circuit including a multiplexer. When the multiplexer is used, however, an audio signal to be output undergoes deformation, which poses a problem that distortion performance of the audio signal to be output is deteriorated.

SUMMARY OF THE INVENTION

The present invention is directed to an optical disk apparatus capable of acknowledge the user of the switching to the external signal when the user switches the selector switch to a state where the external signal is selected while preventing deterioration of the distortion performance of the audio signal to be output.

According to a first aspect of the invention, there is provided an optical disk apparatus including: a read-out unit that reads out video and audio data recorded in an optical disk; a signal generation unit that generates a video signal and an audio signal from the data read by the read-out unit; a video signal switching unit that selectively outputs, to a video output terminal, one of the video signal generated by the signal generation unit and an externally-input video signal input from a device connected to the optical disk apparatus; an audio signal switching unit that includes a selector switch that selectively outputs, to a sound output terminal, one of the audio signal generated by the signal generation unit and an externally-input audio signal input from a device connected to the optical disk apparatus, the contact points activating in association with a state switched by a mechanical manipulation; and a detector that detects the state of the selector switch, wherein the signal generation unit generates a video signal on which an OSD image is superimposed for a predetermined time period when the state of the selector switch detected by the detector is switched to a state where the externally-input audio signal is output to the sound output terminal from a state where the audio signal is output to the sound output terminal, wherein the video signal switching unit switches a video signal to be output to the video output terminal to the externally-input video signal from the video signal generated by the signal generation unit, after the time period has passed when the state of the selector switch detected by the detector is switched to the state where the externally-input audio signal is output to the sound output terminal from the state where the audio signal is output to the sound output terminal, and wherein the optical disk apparatus further including: a sound output limiting unit that limits an output of the externally-input audio signal to the sound output terminal until the time period passes, when the state of the selector switch detected by the detector is switched to the state where the externally-input audio signal is output to the sound output terminal from the state where the audio signal is output to the sound output terminal; a display that displays a video image according to the video signal output to the video output terminal; and an audio output unit that outputs audio according to the audio signal output to the sound output terminal, wherein the video signal switching unit switches a video signal to be output to the video output terminal to the video signal from the externally-input video signal, when the state of the selector switch detected by the detector is switched to the state where the audio signal is output to the sound output terminal from the state where the externally-input audio signal is output to the sound output terminal.

According to a second aspect of the invention, there is provided an optical disk apparatus including: a read-out unit that reads out video and audio data recorded in an optical disk; a signal generation unit that generates a video signal and an audio signal from the data read by the read-out unit; a video signal switching unit that selectively outputs, to a video output terminal, one of the video signal generated by the signal generation unit and an externally-input video signal input from a device connected to the optical disk apparatus; an audio signal switching unit that includes a selector switch that selectively outputs, to a sound output terminal, one of the audio signal generated by the signal generation unit and an externally-input audio signal input from a device connected to the optical disk apparatus, the contact points activating in association with a state switched by a mechanical manipulation; and a detector that detects the state of the selector switch, wherein the signal generation unit generates a video signal on which an OSD image is superimposed for a predetermined time period when the state of the selector switch detected by the detector is switched to a state where the externally-input audio signal is output to the sound output terminal from a state where the audio signal is output to the sound output terminal, and wherein the video signal switching unit switches a video signal to be output to the video output terminal to the externally-input video signal from the video signal generated by the signal generation unit, after the time period has passed when the state of the selector switch detected by the detector is switched to the state where the externally-input audio signal is output to the sound output terminal from the state where the audio signal is output to the sound output terminal.

BRIEF DESCRIPTION OF THE DRAWINGS

In the accompanying drawings:

FIG. 1 is a block diagram showing a configuration of a major portion of an optical disk apparatus according to an embodiment;

DETAILED DESCRIPTION

Figure 2A:
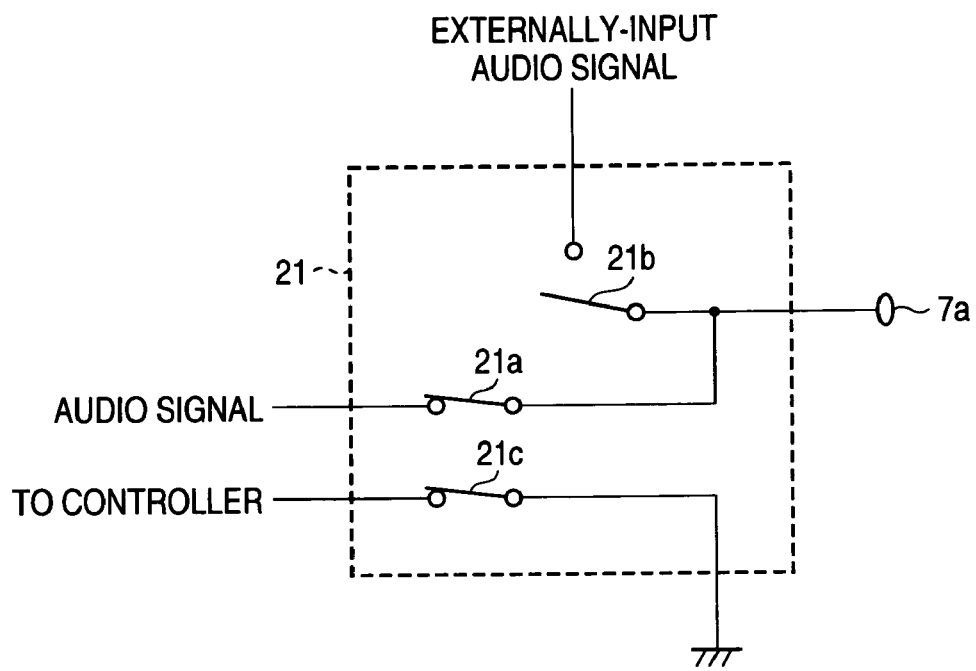
FIGS. 2A and 2B are views showing a configuration of an audio signal switching portion in the optical disk apparatus.

Hereinafter, an optical disk apparatus according to an embodiment will be described. Herein, a portable optical disk apparatus in which relatively small display and speakers are provided in a main body thereof for outdoor use will be described as an example.

FIG. 1 is a block diagram showing a configuration of a major portion of the optical disk apparatus according to the embodiment. An optical disk apparatus 1 of the embodiment includes: a controller 2 that controls operations of the main body; a read-out portion 3 that reads video and audio data (hereinafter, referred to as AV data) recorded in an optical disk 20 set in the main body; a video signal generation unit 4 that generates a video signal according to the AV data (video data) read by the read-out portion 3; an audio signal generation unit 5 that generates an audio signal according to the AV data (audio data) read by the read-out portion 3; a video signal switching unit 6 that outputs either the video signal generated in the video signal generation unit 4 or a video signal inputted therein via an external video input terminal 15 (hereinafter, referred to as the externally-input video signal) to a video output terminal 6a; an audio signal switching portion 7 that outputs either the audio signal generated in the audio signal generation unit 5 or an audio signal inputted therein via an external sound input terminal 16 (hereinafter, referred to as the externally-input audio signal) to a sound output terminal 7a; a display 8 that displays videos according to a video signal output to the video output terminal 6a; a mute circuit 9 that limits an output of audio according to an audio signal output to the audio signal output terminal 7a; and speakers 10 that outputs audio according to an audio signal inputted therein via the mute circuit 9.

Although it is not shown in FIG. 1, the controller 2 is connected to the respective components.

The read-out portion 3 has a known pickup head (not shown), and reads AV data recorded in the optical disk 20, such as a CD and a DVD, set in the main body by emitting a laser beam to the optical disk 20 and detecting reflected light therefrom. The AV data read from the optical disk 20 by the read-out portion 3 is the data encoded by MPEG or the like. Of the AV data read by the read-out portion 3, the video data is inputted into the video signal generation unit 4 while the audio data is inputted into the audio signal generation unit 5.

The video signal generation unit 4 generates a video signal according to the video data inputted from the read-out portion 3. Also, the video signal generation unit 4 is furnished with an OSD function of generating a playback signal of a composite video in which an OSD image made of characters or graphics is superimposed on videos of the video signal thus generated. The video signal generation unit 4 is provided with an unillustrated memory, and image data of the OSD image is stored in this memory. The video signal generation unit 4 inputs the video signal thus generated into the video signal switching unit 6. The audio signal generation unit 5 generates an audio signal according to the audio data inputted from the read-out portion 3. The audio signal generation unit 5 inputs the audio signal thus generated to the audio signal switching portion 7. Besides the video signal, the externally-input video signal is inputted into the video signal switching unit 6 via the external video input terminal 15. The video signal switching unit 6 is a so-called multiplexer, and outputs either the video signal or the externally-input video signal being inputted therein to the output terminal 6a. The video signal switching unit 6 switches the video signals to be output to the video output terminal 6a according to a command from the controller 2.

Besides the audio signal, the externally-input audio signal is inputted into the audio signal switching portion 7 via the external sound input terminal 16. The audio signal switching portion 7 comprises a slide switch having contact points that activate in association with the state switched by a mechanical manipulation. The slide switch is a lock switch that maintains the manipulated stated. The user switches its state to an internal selection state (a state where the switch is slid to one side) or an external selection state (a state where the switch is slid to the other side) by mechanically manipulating the slide switch.

Figure 2B:
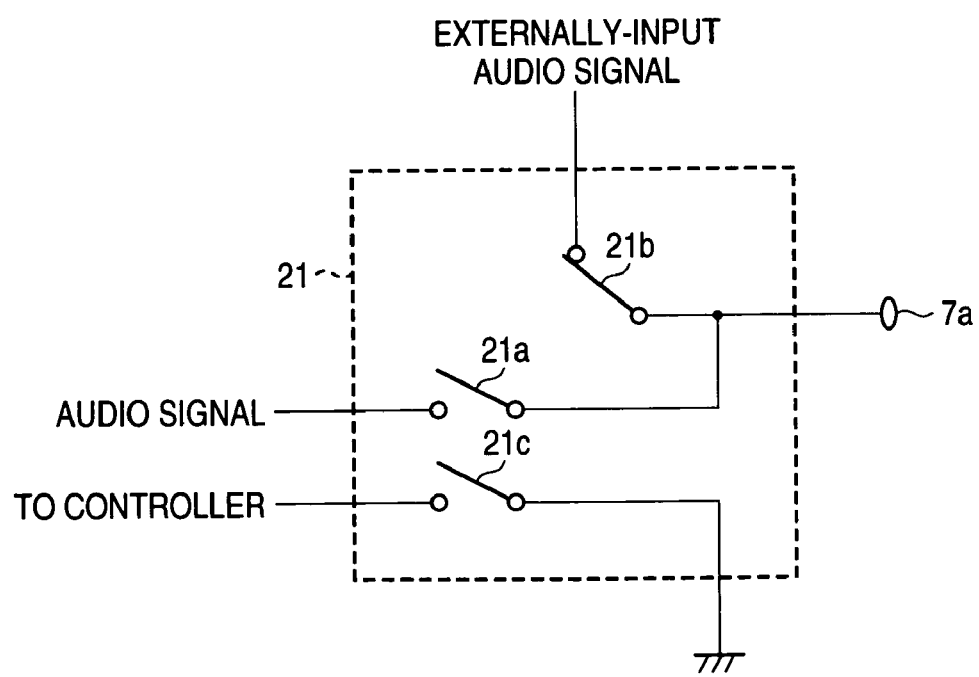

FIGS. 2A and 2B are views showing the circuit configuration of the audio signal switching portion 7 in the optical disk apparatus 1 of the embodiment. As is shown in FIG. 2, a slide switch 21 has three contact points that activate in association with the current state. A contact point 21a switches the audio signal to be connected to or disconnected from the sound output terminal 7a. A contact point 21b switches the externally-input audio signal to be connected to or disconnected from the sound output terminal 7a. A contact point 21c is a contact point provided to a signal line to allow the controller 2 to detect the state of the slide switch 21, and switches the signal line to be connected to or disconnected from the ground. When the state of the slide switch 21 is the internal selection state, as is shown in FIG. 2A, the contact 21a connects the audio signal to the sound output terminal 7a, and the contact point 21b disconnects the externally-input audio signal from the sound output terminal 7a while the contact point 21c connects the signal line that allows the controller 2 to detect the state of the slide switch 21 to the ground. On the other hand, when the state of the slide switch 21 is the external selection state, as is shown in FIG. 2B, the contact point 21a disconnects the audio signal from the sound output terminal 7a, and the contact point 21b connects the externally-input audio signal to the sound output terminal 7a; further the contact point 21c disconnects the signal line that allows the controller 2 to detect the state of the slide switch 21 from the ground. The slide switch 21 is attached to a location at which the user can manipulate the slide switch 21 easily and confirm the state readily, for example, on the front face or the side face of the main body.

The display 8 displays videos according to a video signal (video signal or externally-input video signal) being output to the video output terminal 6a. The speakers 10 output audio according to an audio signal (audio signal or externally-input audio signal) being output to the sound output terminal 7a. The mute circuit 9, provided between the sound output terminal 7a and the speakers 10, limits an input of the audio signal being output to the sound output terminal 7a to the speakers 10 according to a command from the controller 2. To be more concrete, when the controller 2 issues a command to switch ON, the mute circuit 9 prohibits the audio signal being output to the sound output terminal 7a from being inputted to the speakers 10. On the contrary, when the controller 2 issues a command to switch OFF, it inputs the audio signal being output to the sound output terminal 7a to the speakers 10.

Operations of the optical disk apparatus 1 of the embodiment will now be described. The optical disk apparatus 1 operates as follows. When the state of the slide switch 21 is the internal selection state where the internal signal is selected, the controller 2 issues a command to the video signal switching unit 6 to output the video signal to the video output terminal 6a. By detecting whether the signal line provided with the contact point 21c of the slide switch 21 is connected to the ground, the controller 2 detects whether the state of the slide switch 21 is the internal selection state or the external selection state. The video signal generation unit 4 generates the video signal according to the video data in the AV data read from the optical disk 20 by the read-out portion 3, and inputs the same to the video signal switching unit 6. Also, the audio signal generation unit 5 generates the audio signal according to the audio data in the AV data read from the optical disk 20 by the read-out portion 3, and inputs the same to the audio signal switching portion 7. The video signal switching unit 6 outputs the video signal generated in the video signal generation unit 4 to the output terminal 6a according to a command from the controller 2. The display 8 therefore displays videos according to the video signal, that is, videos according to the video data recorded in the optical disk 20. In this instance, the video signal switching unit 6 does not output the externally-input video signal to the video output terminal 6a even when the externally-input video signal is inputted therein via the external video signal input terminal 15.

Because the slide switch 21 is in the internal selection state, as is shown in FIG. 2A, the audio signal switching portion 7 outputs the audio signal generated in the audio signal generation unit 5 to the sound output terminal 7a via the contact point 21a of the slide switch 21. Audio according to the audio signal, that is, audio of the AV data recorded in the optical disk 20, are thus output from the speakers 10. In this instance, the audio signal switching portion 7 does not output the externally-input audio signal to the sound output terminal 7a even when the externally-input audio signal is inputted therein via the external sound input terminal 16.

In a case where the controller 2 issues a command to the mute circuit 9 to switch ON, because the mute circuit 9 prohibits the audio signal being output to the sound output terminal 7a from being inputted to the speakers 10, no sound is output from the speakers 10. The ON and OFF states of the mute circuit 9 can be switched by an unillustrated manipulation portion.

Also, when the state of the slide switch 21 is the external selection state where the external signal is selected, the controller 2 issues a command to the video signal switching unit 6 to output the externally-input video signal to the video output terminal 6a. The controller 2 detects whether the state of the slide switch 21 is the internal selection state or the external selection state by detecting whether the signal line provided with the contact point 21c of the slide switch 21 is connected to the ground as has been described. In this instance, when the read-out portion 3 is reading the AV data from the optical disk 20, the video signal generation unit 4 generates the video signal according to the video data in the AV data read by the read-out portion 3. Also, when the read-out portion 3 is reading the AV data from the optical disk 20, the audio signal generation unit 5 generates the audio signal according to the audio data in the AV data read by the read-out portion 3. The video signal switching unit 6 outputs the externally-input video signal being inputted therein via the external video input terminal 15 to the output terminal 6a according to a command from the controller 2. The display 8 therefore displays videos according to the externally-input video signal being inputted via the external video input terminal 15. In this instance, the video signal switching unit 6 does not output the video signal to the video output terminal 6a.

Also, because the slide switch 21 is in the external selection state, as is shown in FIG. 2B, the audio signal switching portion 7 outputs the externally-input audio signal to the sound output terminal 7a via the contact point 21b of the slide switch 21. Audio according to the externally-input audio signal are thus output from the speakers 10. In this instance, the audio signal switching portion 7 does not output the audio signal to the sound output terminal 7a.

When the controller 2 issues a command to the mute circuit 9 to switch ON, because the mute circuit 9 prohibits the externally-input audio signal being output to the sound output terminal 7a from being inputted to the speakers 10, no sound is output from the speakers 10.

As has been described, because the audio signal switching portion 7 is configured to switch between the connection and disconnection of the audio signal to be output to the sound output terminal 7a by means of the contact points 21a and 21b, the distortion performance of the audio signal to be output to the sound output terminal 7a will not be deteriorated. Hence, either the internal signal or the external signal is selected by the slide switch 21 for the user to hear appropriate distortionless audio, which can in turn enhance the reliability.

Figure 3:
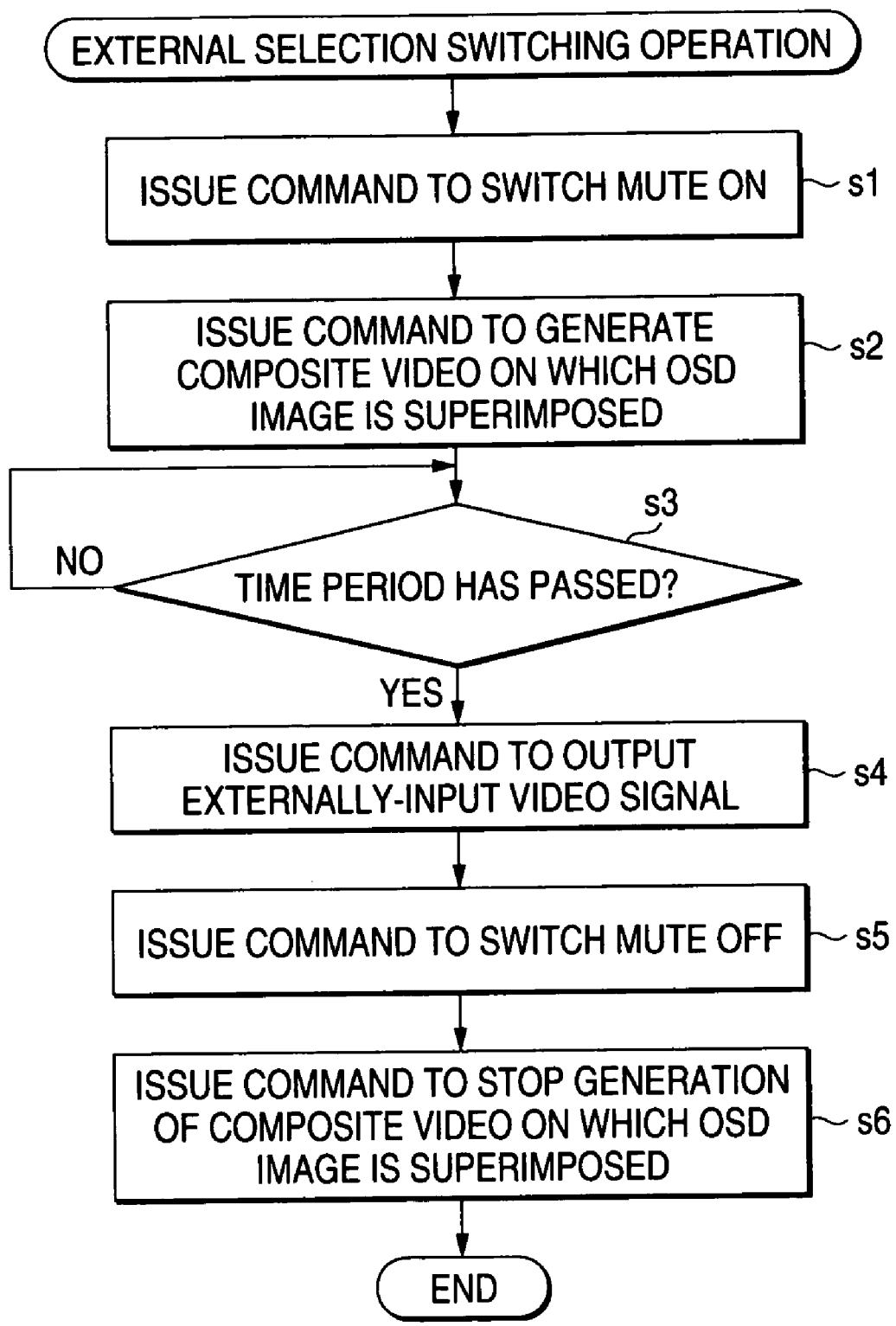
FIG. 3 is a flowchart detailing an external selection switching operation in the optical disk apparatus.

An operation when the state of the slide switch 21 is switched to the external selection state from the internal selection state will now be described. FIG. 3 is a flowchart detailing the external selection switching operation. When the signal line provided with the contact point 21c is switched to the state where it is disconnected from the ground from the state where it is connected to the ground, the controller 2 performs the processing detailed in FIG. 3 upon judging that the slide switch 21 is manipulated mechanically and it is switched to the external selection state from the internal selection state.

Initially, the controller 2 issues a command to the mute circuit 9 to switch ON (s1). The mute circuit 9 follows this command and prohibits the audio signal from being inputted to the speakers 10. The output of audio from the speakers 10 is thus stopped. In this instance, the contact points 21a through 21c of the slide switch 21 are in the states as shown in FIG. 2B, and the audio signal that is prohibited from being inputted to the speakers 10 by the mute circuit 9 is the externally-input audio signal. Also, at this point in time, the controller 2 has not issued a command to the video signal switching unit 6 to switch the video signal to be output to the video output terminal 6a to the externally-input video signal from the video signal. Hence, at this point in time, the video signal switching unit 6 outputs the video signal to the video output terminal, and the display 8 displays videos according to the video signal.

The controller 2 issues a command to the video signal generation unit 4 to generate a composite video in which an OSD image indicating the switching to the external selection state (for example, a character image of "AUX") is superimposed on playback videos according to the video data in the AV data read from the optical disk 20 by the read-out portion 3 (s2). The video signal generation unit 4 then generates the composite video in which an OSD image indicating the switching to the external selection state (for example, a character image of "AUX") is superimposed on playback videos according to the video data in the AV data read from the optical disk 20 by the read-out portion 3 according to this command. The display 8 thus displays videos according to the video signal for the composite video. This allows the user to acknowledge that the internal selection state is switched to the external selection state.

The controller 2 issues a command to the video signal switching unit 6 to switch the video signal to be output to the video output terminal 6a to the externally-input video signal from the video signal after a predetermined time period, for example, about 5 sec, has passed since it judged the switching of the slide switch 21 to the external selection state from the internal selection state (s3 and s4). The video signal switching unit 6 outputs the externally-input video signal being inputted therein via the external video input terminal 15 to the video output terminal 6a according to this command. The display 8 therefore displays videos according to the externally-input video signal being inputted via the external video input terminal 15. Also, the controller 2 issues a command to the mute circuit 9 to switch OFF (s5). The mute circuit 9 is thus switched OFF, and audio according to the externally-input audio signal are output from the speakers 10. Further, the controller 2 issues a command to the video signal generation unit 4 to stop generating the composite video (s6), upon which the processing ends.

As has been described, according to the optical disk apparatus 1 of the embodiment, while the display 8 displays the composite video, on which the OSD image indicating the switching to the external selection state is superimposed, the mute circuit 9 is controlled to stay ON to prohibit audio according to the externally-input audio signal from being output from the speakers 10. It is thus possible to avoid an imbalanced state where the display 8 displays the videos according to the video signal while audio according to the externally-input audio signal are output from the speakers 10. As a consequence, the user will not have an uncomfortable feeling.

Also, the timing at which the video signal to be output to the video output terminal 6a is switched to the externally-input video signal from the video signal is delayed by a predetermined time period since the slide switch 21 was switched to the external selection state from the internal selection state, and the display 8 keeps displaying the composite video, on which the OSD image indicating the switching to the external input is superimposed, during this time period. This allows the user to acknowledge the switching to the external selection state.

Further, because a command is issued to the video signal generation unit 4 to stop generating the composite video in s6, it is possible to prevent the video signal generation unit 4 from performing useless processing (processing of generating composite videos that will never be displayed on the display 8).

Figure 4:
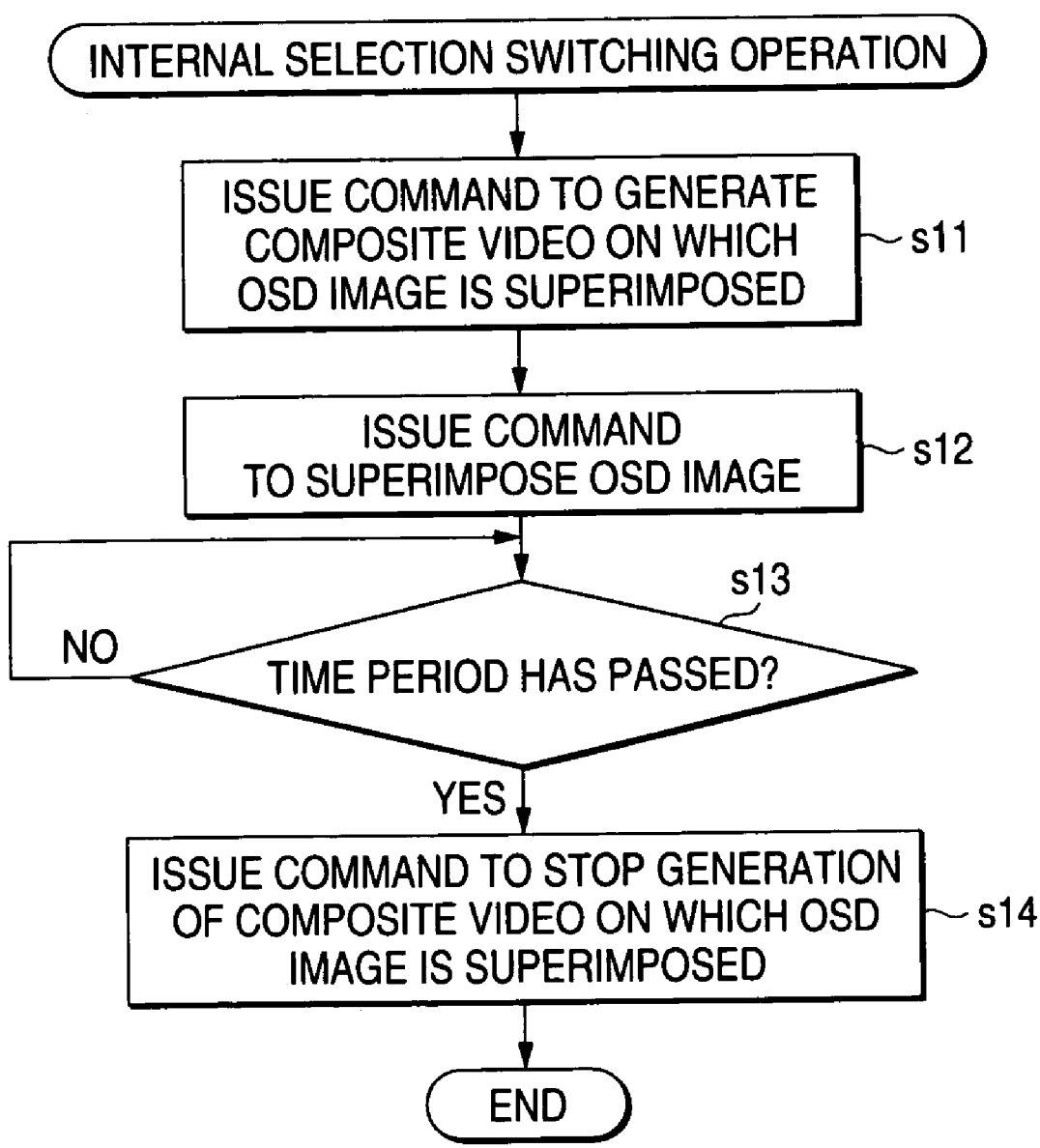
FIG. 4 is a flowchart detailing an internal selection switching operation in the optical disk apparatus.

An operation when the slide switch 21 is switched to the internal selection state from the external selection state will now be described. FIG. 4 is a flowchart detailing the internal selection switching operation. When the signal line provided with the contact portion 21c is changed to the state where it is connected to the ground from the state where it is disconnected from the ground, the controller 2 performs the processing detailed in FIG. 4 upon judging that the slide switch 21 is manipulated mechanically and it is switched to the internal selection state from the external selection state.

Initially, the controller 2 issues a command to the video signal switching unit 6 to switch the video signal to be output to the video output terminal 6a to the video signal from the externally-input video signal (s11). The video signal switching unit 6 then outputs the video signal generated in the video signal generation unit 4 to the video output terminal 6a according to this command. The display 8 thus displays videos according to the video signal generated in the video signal generation unit 4. In this instance, the contact portions 21a through 21c of the slide switch 21 are in the states shown in FIG. 2A, and the audio signal is inputted into the speakers 10 via the mute circuit 9. Audio according to the audio signal are therefore output from the speakers 10.

The controller 2 issues a command to generate a composite video in which an OSD image indicating the switching to the internal selection state from the external selection state (for example, a character image of "DVD") is superimposed on playback videos according to the video data in the AV data read from the optical disk 20 by the read-out portion 3 (s12). The video signal generation unit 4 then generates the composite video in which an OSD image indicating the switching to the internal selection state is superimposed on playback videos according to the video data in the AV data read from the optical disk 20 by the read-out portion 3 according to this command. The display 8 therefore displays videos according to the video signal for the composite video. This allows the user to acknowledge that the external selection state is switched to the internal selection state.

The controller 2 issues a command to the video signal generation unit 4 to stop generating the composite video after a predetermined time period, for example, about 5 sec, has passed since it judged the switching of the slide switch 21 to the internal selection state from the external selector switch (s13 and s14), upon which the processing ends.

As has been described, in the optical disk apparatus 1 of the embodiment, the display 8 immediately starts to display the composite video on which the OSD image indicating the switching to the internal selection state is superimposed when the slide switch 21 is switched to the internal selection state from the external selection state. It is thus possible to allow the user to acknowledge the switching to the internal selection state from the external selection state at once.

While the embodiment above has described the invention of the present application with reference to the portable optical disk apparatus 1 provided with the display 8 and the speakers 10, the invention is applicable to a stationary optical disk apparatus that is not provided with the display 8 and the speakers 10.

As described with reference to the embodiment, because the switching of audio signals to be output to the sound output terminal is performed by a switch having contact points that activate in association with the state switched by a mechanical manipulation, the distortion performance of the audio signal to be output to the sound output terminal will not be deteriorated. In addition, when the state of the selector switch is switched to the state where the externally-input audio signal is output to the sound output terminal from the state where the audio signal is output to the sound output terminal, the video signal switching unit keeps outputting a video signal of a composite image, on which a specific OSD image, more specifically, an OSD image indicating the switching of the output to the external signal, is superimposed, to the video output terminal until the time period has passed. This allows the user to acknowledge the switching to the external signal.

The optical disk apparatus may further include sound output limiting unit for limiting an output of the externally-input audio signal to the sound output terminal until the time period has passed when the state of the selector switch detected by the detector is switched to the state where the externally-input audio signal is output to the sound output terminal from the state where the audio signal is output to the sound output terminal.

According to the above configuration, when the state of the selector switch is switched to the state where the externally-input audio signal is output to the sound output terminal from the state were the audio signal is output to the sound output terminal, the sound output limiting unit limits the output of the audio signal until the time period has passed. It is thus possible to avoid an imbalanced state where the externally-input audio signal is output while the video signal is output. Consequently, the user will not have an uncomfortable feeling.

The video signal switching unit may be configured to switch a video signal to be output to the video output terminal to the video signal from the externally-input video signal when the state of the selector switch detected by the detector is switched to the state where the audio signal is output to the sound output terminal from the state where the externally-input audio signal is output to the sound output terminal.

When configured in this manner, when the state of the selector switch is switched to the state where the audio signal is output to the sound output terminal from the state where the externally-input audio signal is output to the sound output terminal, the video signal switching unit immediately starts to output the video signal to the video output terminal. The switching to the external to the internal is therefore performed smoothly, and the ease of use for the user will not be deteriorated.

Also, the optical disk apparatus may be configured as a portable optical disk apparatus for outdoor use by further including display for displaying videos according to a video signal output to the video output terminal, and audio output unit for outputting audio according to an audio signal output to the sound output terminal.

According to the embodiment, because it is configured to switch the audio signals to be output to the output terminal by a switch having contact points that activate in association with the state switched by a mechanical manipulation, the distortion performance of the audio signal to be output to the output terminal will not be deteriorated. In addition, when the state of the selector switch is switched to the state where the externally-input audio signal is output to the sound output terminal from the state where the audio signal is output to the sound output terminal, the video signal switching unit keeps outputting a video signal, on which a specific OSD image, more specifically, an OSD image indicating the switching of the output to the external signal, is superimposed, to the video output terminal until the time period has passed. This allows the user to acknowledge the switching to the external signal.

Although the present invention has been shown and described with reference to the embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An optical disk apparatus comprising:
    a read-out unit that reads out video and audio data recorded in an optical disk;
    a signal generation unit that generates a video signal and an audio signal from the data read by the read-out unit;
    a video signal switching unit that selectively outputs, to a video output terminal, one of the video signal generated by the signal generation unit and an externally-input video signal input from a device connected to the optical disk apparatus;
    an audio signal switching unit that includes a selector switch that selectively outputs, to a sound output terminal, one of the audio signal generated by the signal generation unit and an externally-input audio signal input from a device connected to the optical disk apparatus, the contact points activating in association with a state switched by a mechanical manipulation; and
    a detector that detects the state of the selector switch,
    wherein the signal generation unit generates a video signal on which an On Screen Display (OSD) image is superimposed for a predetermined time period when the state of the selector switch detected by the detector is switched to a state where the externally-input audio signal is output to the sound output terminal from a state where the audio signal is output to the sound output terminal,
    wherein the video signal switching unit switches a video signal to be output to the video output terminal to the externally-input video signal from the video signal generated by the signal generation unit, after the time period has passed when the state of the selector switch detected by the detector is switched to the state where the externally-input audio signal is output to the sound output terminal from the state where the audio signal is output to the sound output terminal, and
    wherein the optical disk apparatus further comprising:
    a sound output limiting unit that limits an output of the externally-input audio signal to the sound output terminal until the time period passes, when the state of the selector switch detected by the detector is switched to the state where the externally-input audio signal is output to the sound output terminal from the state where the audio signal is output to the sound output terminal;

a display that displays a video image according to the video signal output to the video output terminal; and an audio output unit that outputs audio according to the audio signal output to the sound output terminal, wherein the video signal switching unit switches a video signal to be output to the video output terminal to the video signal from the externally-input video signal, when the state of the selector switch detected by the detector is switched to the state where the audio signal is output to the sound output terminal from the state where the externally-input audio signal is output to the sound output terminal.

2. An optical disk apparatus comprising:

a read-out unit that reads out video and audio data recorded in an optical disk;

a signal generation unit that generates a video signal and an audio signal from the data read by the read-out unit;

a video signal switching unit that selectively outputs, to a video output terminal, one of the video signal generated by the signal generation unit and an externally-input video signal input from a device connected to the optical disk apparatus;

an audio signal switching unit that includes a selector switch that selectively outputs, to a sound output terminal, one of the audio signal generated by the signal generation unit and an externally-input audio signal input from a device connected to the optical disk apparatus, the contact points activating in association with a state switched by a mechanical manipulation; and a detector that detects the state of the selector switch, wherein the signal generation unit generates a video signal on which an On Screen Display (OSD) image is superimposed for a predetermined time period when the state of the selector switch detected by the detector is switched to a state where the externally-input audio signal is output to the sound output terminal from a state where the audio signal is output to the sound output terminal, and wherein the video signal switching unit switches a video signal to be output to the video output terminal to the externally-input video signal from the video signal generated by the signal generation unit, after the time period has passed when the state of the selector switch detected by the detector is switched to the state where the externally-input audio signal is output to the sound output terminal from the state where the audio signal is output to the sound output terminal.

3. The optical disk apparatus according to claim 2, further comprising a sound output limiting unit that limits an output of the externally-input audio signal to the sound output terminal until the time period passes, when the state of the selector switch detected by the detector is switched to the state where the externally-input audio signal is output to the sound output terminal from the state where the audio signal is output to the sound output terminal.

4. The optical disk apparatus according to claim 2, wherein the video signal switching unit switches a video signal to be output to the video output terminal to the video signal from the externally-input video signal, when the state of the selector switch detected by the detector is switched to the state where the audio signal is output to the sound output terminal from the state where the externally-input audio signal is output to the sound output terminal.

5. The optical disk apparatus according to claim 2, further comprising:

a display that displays a video image according to the video signal output to the video output terminal; and an audio output unit that outputs audio according to the audio signal output to the sound output terminal.

* * * * *